(12) United States Patent
Lewis

(10) Patent No.: US 7,769,847 B2
(45) Date of Patent: Aug. 3, 2010

(54) METHOD AND APPARATUS FOR A COMPREHENSIVE NETWORK MANAGEMENT SYSTEM

(75) Inventor: Lundy M. Lewis, Mason, NH (US)

(73) Assignee: Computer Associates Think, Inc., Islandia, NY (US)

( * ) Notice: Subject to any disclaimer, the term of this patent is extended or adjusted under 35 U.S.C. 154(b) by 1612 days.

(21) Appl. No.: 10/332,930

(22) PCT Filed: Jul. 13, 2001

(86) PCT No.: PCT/US01/22107

§ 371 (c)(1),
(2), (4) Date: Jun. 19, 2003

(87) PCT Pub. No.: WO02/06971

PCT Pub. Date: Jan. 24, 2002

(65) Prior Publication Data

US 2004/0153533 A1 Aug. 5, 2004

Related U.S. Application Data

(60) Provisional application No. 60/217,968, filed on Jul. 13, 2000.

(51) Int. Cl.
*G06F 15/173* (2006.01)
(52) U.S. Cl. .................................................... 709/224
(58) Field of Classification Search .......... 709/223–225; 714/4
See application file for complete search history.

(56) References Cited

U.S. PATENT DOCUMENTS 5,768,501 A * 6/1998 Lewis .......................... 714/48

5,777,549 A * 7/1998 Arrowsmith et al. ........ 340/506
5,832,503 A * 11/1998 Malik et al. ................. 709/223

(Continued)

OTHER PUBLICATIONS

Lewis et al., Incorporating Business Process Management into Network and Systems Management,1997, pp. 385-392.*

(Continued)

*Primary Examiner*—Larry Donaghue
(74) *Attorney, Agent, or Firm*—Pillsbury Winthrop Shaw Pittman LLP

(57) ABSTRACT

In a system for managing data, voice, application and video networks and associated systems and services that comprise multiple, interconnected network technologies, a management system suited for a particular networking technology manages each separate technology domain. Multiple management systems thus manage multiple domains with respect to fault, configuration, accounting, performance, and security management. The management systems that manage the individual networking technology domains are then themselves managed by a higher-level system, called an inter-domain management system, which performs cross-domain management. The individual management systems of the invention collect data from their respective technology domains and provide it to an intra-domain data collection function. This data is then utilized by an inter-domain data correlation function to determine what instructions should be sent from an intra-domain instruction function to each management system for implementation in its respective technology domains. The comprehensive management system thus collects data from each lower-level management system and, if required, sends operational instructions back to each lower level system. Event correlation and service level management are performed at both the intra-domain and inter-domain levels. Business process management is performed at the inter-domain level.

23 Claims, 11 Drawing Sheets

U.S. PATENT DOCUMENTS

| | | | |
|---|---|---|---|
| 6,421,719 B1* | 7/2002 | Lewis et al. | 709/224 |
| 7,197,546 B1* | 3/2007 | Bagga et al. | 709/223 |
| 2002/0188584 A1* | 12/2002 | Ghannam et al. | 707/1 |
| 2005/0283445 A1* | 12/2005 | Trinon et al. | 705/75 |

OTHER PUBLICATIONS

Lewis et al., The Development of Integrated Inter and Inta Domain Management Services, 1999, pp. 280-292.*

Muller, Web-accessible Network Management Tools, 1997, pp. 288-297.*

Seitz, A Modelling Technique for Inter-Domain Management, Jun. 2000, pp. 858-862.*

Lee, Design and Implementation of a Configuration Management System, 1993, pp. 1563-1567.*

Chuah et al. QOS Provisions Using a Clearing House Architecture, Jun. 2000, pp. 115-124.*

Dr. Lundy Lewis, Spectrum Service level Management definition, Offerings, and Strategy, Mar. 30, 1998 pp. 1-17.*

Bjerring et al. "Experiences in developing multi-technology TMN systems" IEE 1998, pp. 445-454.*

Mortensen Operations Architecture for Data-Centric Converged Telecommunications Networks: Lucent Technologies' Open Operations CORBA Architecture 1-10 pp. 1-10.*

ITU-T Digital Networks Genric Functional Architecture of Transport Network Nov. 1995, 1-46.*

Managing Business and Service Networks (Kluwer/Plenum Publishers, 2001) Lundy Lewis. Chapter 8.

* cited by examiner

| | | |
|---|---|---|
| 210 | Generic components | devices, media, computers, applications, services |
| 220 | Functional areas | fault, configuration, accounting, performance, security |
| 230 | Layers of abstraction | element, network, service, business management |
| 240 | Service networks | network 1, network 2, ..., network n |
| 250 | Voice/data networks | network 1, network 2, ..., network n |

METHOD AND APPARATUS FOR A COMPREHENSIVE NETWORK MANAGEMENT SYSTEM

RELATED APPLICATIONS

This application claims priority to U.S. Provisional Application Ser. No. 60/217,968, filed Jul. 13, 2000.

FIELD OF THE INVENTION

The invention relates to management of communications networks and, in particular, to comprehensive management of a network comprised of multiple interconnected networking technologies and associated systems, including management of multi-domain services.

BACKGROUND

Traditionally, networks and services that consist of, or depend upon, several different interconnected networking technologies and associated systems and applications, often referred to as multi-domain or heterogeneous networks, have been managed piece-meal, typically utilizing several management systems dedicated to the specific networking technologies and applications. This makes it very difficult to manage the multi-domain network from an end-to-end perspective. Because this method is non-comprehensive and largely non-automated, it tends to be expensive and error-prone, requiring the coordination and use of many different individuals and resources, as well as disparate management systems.

Today's business and service networks are complex. Since the current state of any particular network has more than likely evolved in a piecemeal fashion, it likely includes heterogeneous kinds of network technologies, equipment from multiple vendors, and various kinds of management methods. To make matters worse, management methods vary between countries and even between districts within countries. In many cases, the result is either piecemeal management, in which narrowly focused management solutions co-exist but do not cooperate, or no management at all.

FCAPS (fault, configuration, accounting, performance, and security) management is possible for most individual networking technologies and associated systems and applications. However, these functions are typically provided by management systems that manage only that specific kind of networking technology, system, or application. Aprisma Management Technologies' Spectrum® Management System is an example of an existing management system that has this capability. The best case, however, would be integrated management, in which these management techniques cooperate in a standardized management framework.

What has been needed, therefore, is a consolidated, automated management tool that can manage networks and services that extend across multiple interconnected underlying networking technologies and associated systems and applications, thus providing management for multi-domain services.

OBJECTS OF THE INVENTION

The object of the present invention is to provide a means by which to manage a multi-domain network consisting of multiple interconnected networking technologies and associated systems and applications, including the ability to perform fault, configuration, accounting, performance, and security (FCAPS) management. A further object of the present invention is to provide end-to-end management of multi-domain services, including element, network, service, and business process management.

SUMMARY

The comprehensive network management system of the invention (i) integrates the management of networks, systems, business applications, and services (ii) integrates the areas of fault, configuration, accounting, performance, and security management, (iii) integrates the element, network, service, and business layers of management information, (iv) integrates the management of diverse networking technologies, and (v) integrates the management methods of both telecommunications and data communications networks.

The invention is a comprehensive system for managing data, voice, application and video networks and associated systems and services that comprise multiple, interconnected network technologies. In one aspect of the invention, a management system suited for a particular networking technology manages each separate technology domain. Multiple management systems thus manage multiple domains with respect to fault, configuration, accounting, performance, and security (FCAPS) management. The management systems that manage the individual networking technology domains are then themselves managed by a higher-level system, called an inter-domain management system, which performs the task of cross-domain management.

The individual management systems of the invention collect data from their respective technology domains and provide it to an intra-domain data collection function. This data is then utilized by an inter-domain data correlation function to determine what instructions should be sent from an intra-domain instruction function to each management system for implementation in its respective technology domain. The comprehensive management system thus collects data from each lower-level management system and, if required, sends operational instructions back to each lower level system.

In the present invention, management functions are performed from a single console and over multiple interconnected underlying networking technologies. The enabling technology for cross-domain management is the same technology that permits operation, administration and maintenance of the underlying networking technologies. Event correlation and service level management are performed at both the intra-domain and inter-domain levels, and business process management is performed at the inter-domain level.

BRIEF DESCRIPTION OF THE DRAWINGS

FIG. 2 is a table illustrating the different dimensions of integrated network management;

DETAILED DESCRIPTION

The present invention is a comprehensive network management system for managing data, voice, application and video networks that (i) integrates the management of diverse, but connected network technologies, (ii) includes the management of systems and software applications at customer premises, and (iii) allows for the provisioning, billing, and control of services that span across multiple kinds of networks. The invention allows comprehensive network management from a single console and over multiple interconnected underlying networking technologies and multi-domain services. It is an automated, consolidated management tool. It has tight integration with underlying element and network management systems.

In the present invention, a management system suited for a particular networking technology (e.g. optical networks, ATM networks, LANS, types of computer systems, types of software applications, etc) manages each separate technology domain within a multi-domain network with respect to fault, configuration, accounting, performance, and security (FCAPS) management. A higher-level system, called a comprehensive management system, performs the task of managing the individual management systems. This comprehensive system collects data from the multiple lower-level management systems and, if required, sends operational instructions to each lower-level management system.

Among other advantages, the invention enables end-to-end FCAPS management, element/network/service/business management, and service provisioning and monitoring from a single console over multiple interconnected networking technologies. Important features of the comprehensive management system of the invention include: (i) domain-specific event correlation, (ii) network, systems, and application management, (iii) layered Telecommunications Model Network (TIN)-style management, and (iv) FCAPS-style management.

The comprehensive network management system of the invention (i) integrates the management of networks, systems, business applications, and services (ii) integrates the areas of fault, configuration, accounting, performance, and security management, (iii) integrates the element, network, service, and business layers of management information, (iv) integrates the management of diverse networking technologies, and (v) integrates the management methods of both telecommunications and data communications networks.

Figure 1:
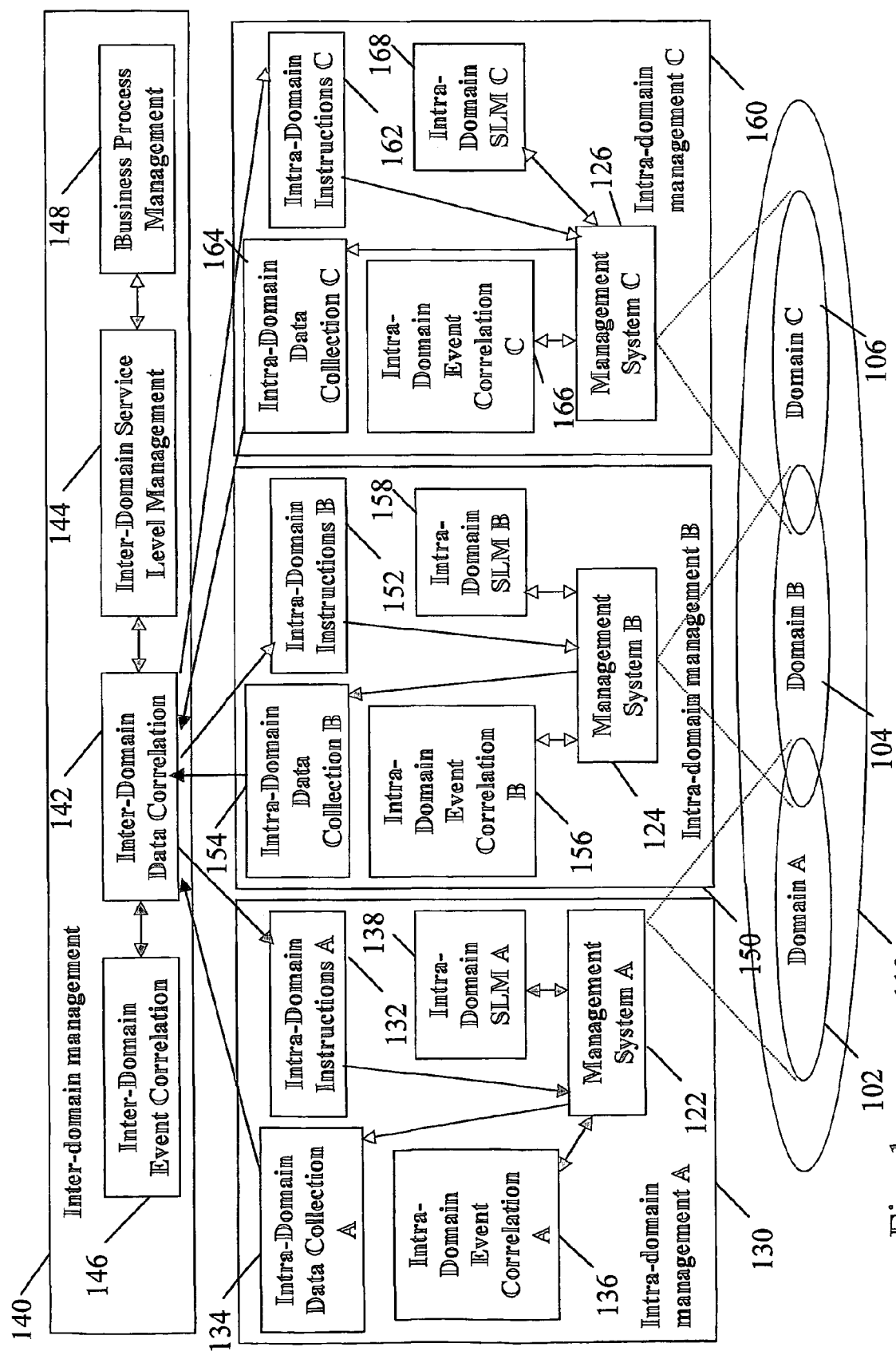
FIG. 1 is a high-level block diagram of an embodiment of a comprehensive network management system according to the present invention.

FIG. 1 is a high-level block diagram of an implementation of an embodiment of a comprehensive network management system according to the present invention. Further details and explanations of the individual components of the invention follow this initial description. As shown in FIG. 1, in the present invention, separate technology-specific management systems are utilized to manage individual technology domains in the enterprise 110. The example embodiment of FIG. 1 has three technology domains. Technology domain A 102 is managed by management system A 122, technology domain B 104 is managed by management system B 124, and technology domain C 106 is managed by management system C 126.

Technology domains A 102, B 104, and C 106 are comprised of elements that are managed devices, networks, systems, and applications. A managed device is any device that can be modeled in a network management system. The managed devices include not only hardware devices such as personal computers, workstations, hubs, bridges and routers, but also software applications. Domains are constructed in accordance with the particular organizational principle by which elements are grouped in a particular network. In general, network elements may be grouped in any way that serves as an aid in understanding and managing the network. Common grouping principles include grouping with respect to topology, device type, location, managerial domains, and/or the organizational structure of a network enterprise.

The management system components 122, 124, and 126 may be filled by Aprisma Spectrum, Hewlett-Packard (HP) OpenView, or any other compatible management system, device or agent capable of managing the associated technology domain. As discussed in more detail later, the management systems 122, 124, and 126 of the invention may be network management systems, element management systems, enterprise management systems, or any other management devices in any combination suitable for managing the networks, devices, systems and applications in the associated technology domain.

The comprehensive network management system of the invention is comprised of conceptual layers, with each layer being successively broader in scope and in what it can manage. At the lowest level of the embodiment of the invention depicted in FIG. 1 is the enterprise 110 and technology domains 102, 104, and 106. The intermediate level of this embodiment is an intra-domain management level, where the individual technology domains are managed and various intra-domain management tasks are performed. The highest level is an inter-domain management level, where the intra-domain management systems and levels are themselves managed and various inter-domain management tasks are performed. In alternate embodiments of the invention, there may be multiple intermediate layers, which may be intra-domain management levels that manage individual domains or other intra-domain management levels, or may be inter-domain management levels that manage intra-domain management levels or even other inter-domain management levels.

The basic structure of the present invention is therefore related to what is sometimes called the "divide and conquer" method of network management. A network is partitioned into logical domains where each domain is managed more or less in isolation by low-level management systems. A higher-level management application then presides over the lower-level systems. This higher-level application is sometimes called a manager of managers (OM). The basic enabling technology for the present invention is therefore the same technology that permits the operation, administration and maintenance (OAM) of the underlying networking technologies.

As shown in FIG. 1, each technology domain A 102, B 104, and C 106 has an associated intra-domain management layer—i.e. domain A 102 is associated with intra-domain management layer A 130, domain B 104 is associated with intra-domain management layer B 150, and domain C 106 is associated with intra-domain management layer C 160. The figure in the text shows a basic two-layer management level system; however, the invention may have any number of intermediate layers and therefore the scope of the invention includes all two and higher layer systems.

In intra-domain management layer A 130 of FIG. 1, management system A 122 collects data from respective technology domain A 102 and makes it available to intra-domain data collection function 134. This data is then provided to, and utilized by, inter-domain management layer 140 to determine what intra-domain instructions should be sent from intra-domain instruction function A 132 to management system A 122 for implementation in respective technology domain A 102.

Similarly, in intra-domain management layers B 150 and C 160, respective management systems B 124 and C 126 collect data from respective technology domains B 104 and C 106 and make it available to respective intra-domain data collection functions B 154 and C 164. This data is then provided to, and utilized by, inter-domain management layer 140 to determine what intra-domain instructions should be sent from respective intra-domain instruction functions B 152 and C 162 to respective management systems B 124 and C 126 for implementation in respective technology domains B 104 and C 106. All of these functions are typically implemented as one or more software applications, using any convenient and suitable method and/or language known in the art.

Intra-domain management layer A 130 also includes intra-domain event correlation engine A 136, which receives data from management system A 122 on events within domain A 102 and then maps certain of them into alarms and possible actions to be sent back to management system A 122. There is also an intra-domain service level management (SLM) function A 138 that receives service data from management system A 122 that is used to develop service instructions to be sent back to management system A 122 for management of intra-domain services.

Similarly, intra-domain management layers B 150 and C 160 also include respective intra-domain event correlation engines B 156 and C 166 and respective intra-domain service level management (SLM) functions B 158 and C 168. The purpose and structure of these functions in the present invention are discussed in more detail later. These functions are typically implemented as one or more software applications, using any convenient and suitable method and/or language known in the art. There are several commercially available systems having these functionality, including Aprisma Management Technologies' Spectrum, HP's Openview, Riversoft's, OpenRiver, Tivoli's TME, Computer Associates UniCenter, so-called "home-grown" systems, and others.

Inter-domain management layer 140 is comprised of inter-domain data correlation function 142, inter-domain event correlation function 146, inter-domain service level management function 144 and business process management function 148. Inter-domain data correlation function 142 receives the data collected by management systems A 122, B 124, and C 126 from respective intra-domain data collection functions A 134, B 154, and C 164 and sends instructions to intra-domain instruction functions A 132, B 152, and C 162. The inter-domain data correlation function 162 is typically implemented as a software application, using any convenient and suitable method and/or language known in the art.

Inter-domain event correlation function 146 receives inter-domain event data from inter-domain data correlation function 142 and uses it to map certain of the events into alarms and actions that are sent back to inter-domain data correlation function 142. Inter-domain service level management function 144 receives service data from inter-domain data correlation function 142 and uses it to manage inter-domain services. Business process management function 148 receives service management data from inter-domain service level management function 144 and uses it to determine whether business objectives and policies are being met, as well as for strategic business planning. The purpose and operation of these functions in the present invention are discussed in more detail later. Again, all of these functions are typically implemented as one or more software applications, using any convenient and suitable method and/or language known in the art and there are several commercially available systems.

It must be noted that the specific devices and systems mentioned herein are examples only, and that alternate constructions, configurations, components, or methods of operation of the invention are to be considered within the scope of the invention. In particular, the network management components may include Aprisma Spectrum, HP OpenView, or any other compatible network, enterprise or other type of management system known in the art. The invention may depend on a network management system or on a collection of element management systems. The former is the preferred embodiment. The communication protocols among management systems may use SNMP, CMIP, CORBA, TL-1 or any other compatible protocols. The communication protocols between management system and managed element may use SNMP, CMIP, CORBA, TL-1 or any other compatible protocols.

The purpose of the comprehensive management system of the invention is to manage all of the types of devices, media, networks, computer systems, software applications, and services that are associated with a technology domain. Examples of the different types of networking technologies that may be part of a technology domain and therefore need to be managed with the invention include, but are not limited to: virtual private networks (VPN), optical networks, Quality-of-Service networks, active programmable networks, wireless networks, ATM switched networks, frame relay networks, cable networks, and customer premises networks (LANs). Different networking technologies may be distinguished with respect to the properties and functionality of transmission devices used, the type of transmission media employed, and the physics and format of data as it travels over the media. Each presents unique management challenges that must be solved in order to achieve comprehensive management.

FIG. 2 is a table summarizing the different dimensions of integrated network management. Networks and their associated systems and services must be viewed at multiple levels of abstraction in order to achieve comprehensive management. As shown in FIG. 2, on one level are the generic network components 210, such as devices, media, computers, applications, and services. At another management level are network management functions 220, such as fault, configuration, accounting, performance, and security. Still another level treats the network in terms of increasing levels of abstraction 230, starting with the element level, then the network level, the service level, and finally the business management level. At other management levels are service networks 240 and voice/data networks 250.

Figure 3:
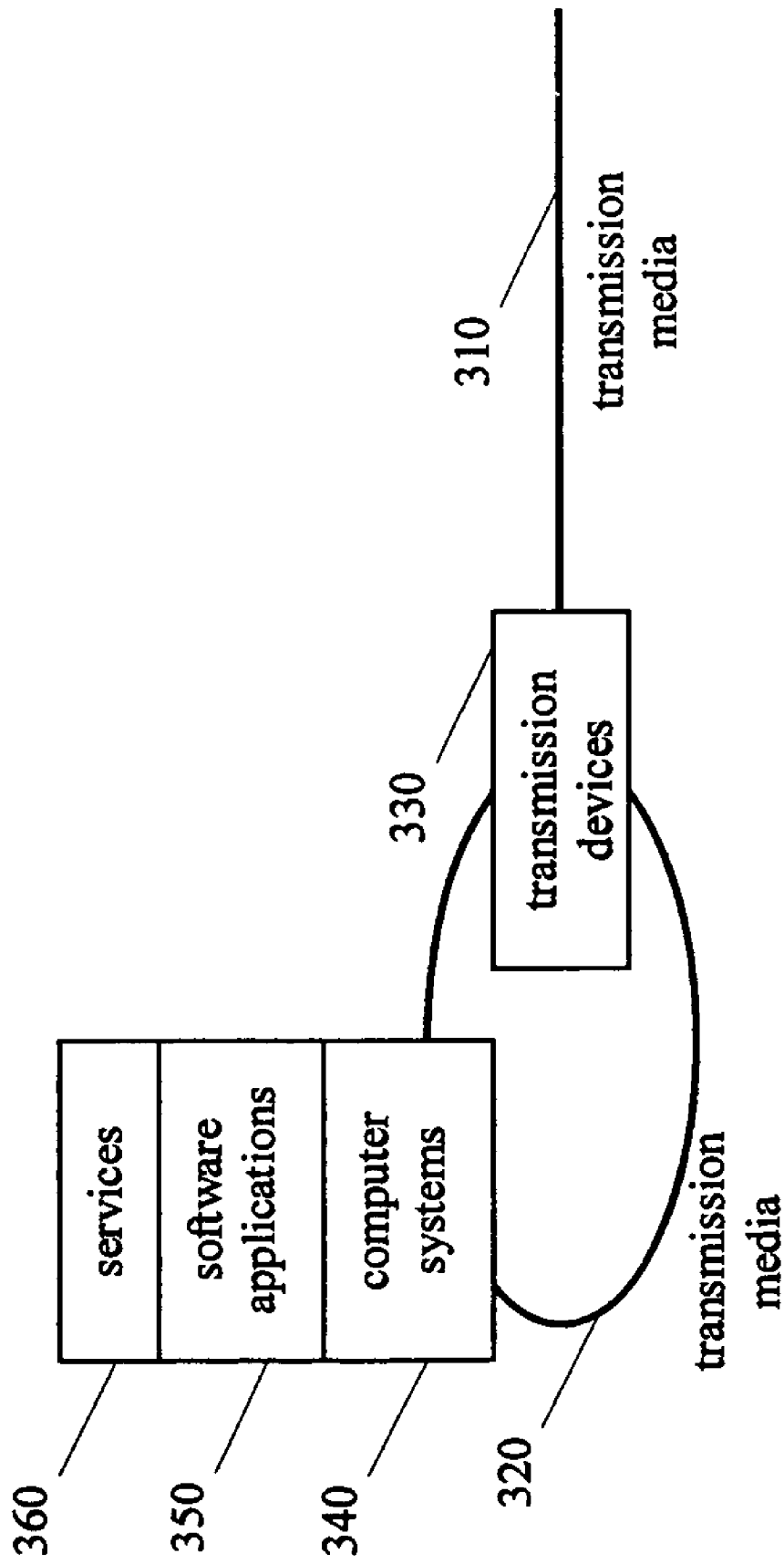
FIG. 3 is a block diagram illustrating the generic components of a network.

FIG. 3 is a block diagram illustrating the generic components of a network. As shown in FIG. 3, the network infrastructure is comprised of the transmission devices 330 that receive traffic from, and forward traffic to, other transmission devices. Examples of such devices include, but are not limited to, routers, hubs, switches, and access devices for wireless networks, cable modems, satellite stations, etc. Traffic flows over the transmission media 310 and 320. Examples of transmission media include, but are not limited to, copper wire, coaxial cable, fiber optic cable, telephone lines, and airwaves.

The generic network of FIG. 3 is also comprised of the computer systems 340 that reside on a network, such as desktop computers, workstations, servers, mainframe computers, laptop computers, and even telephony devices, the software applications 350 that run on the computer systems 340, and the various services 360 that are supported by the software applications 350. Examples of software applications include, but are not limited to, document writing applications, database applications, and scientific applications that support mathematical computation and simulations. Also included are distributed applications that span multiple computer systems that may even be distributed over separate networks. Examples of services 360 include, but are not limited to, such things as electronic commerce, inter-continental email, and distance learning.

A virtual private network (VPN) is a good example of a particular type of network that the present invention must manage. A VPN is a network that is constructed by using both public and private media to connect transmission devices. For example, with reference to FIG. 3, transmission media 310 might include a public network such as the Internet, while transmission media 320 might be a business' private LAN. There are a number of systems that enable the creation of networks using the Internet as the medium for transporting data. These systems use encryption and other security mechanisms to ensure that only authorized users can access the network and that the data cannot be intercepted. A good example is the VPN service offered by Vitts Networks via their Protected Service Network.

One of the underlying technologies that support VPNs is called "IP tunneling." Conceptually, the idea is a private tunnel embedded within transmission media 310 that connects, for example, business-to-business electronic trading. The tunnel should be virtually impenetrable by unauthorized traffic and hackers with malicious intent. The tunnel is physically implemented by a combination of several technologies, including encryption, packet monitoring, firewalls, and network address translation (NAT). The latter technology allows businesses to hide their private IP addresses behind a NAT server so that only the IP address of the NAT server is exposed to the public network.

VPN technology therefore raises several management challenges. One is how issues of quality of service and service guarantees are handled. Since public media are not under the control of service providers, it is difficult to ensure end-to-end application performance when traffic traverses public media. The current solution to this problem is to guarantee a certain quality of service only from customer premises to the edge of the public network. Needless to say, this solution is not entirely acceptable to consumers.

In some VPN configurations, the transmission media and networks are actually owned and operated by separate service providers. This situation presents yet another set of management challenges. With reference to FIG. 3, if there are a number of transmission media 310, each owned by separate service providers, then there are likely to be restrictions on what traffic is allowed to traverse the media. This situation is becoming common in the USA. One approach to the problem is "policy-based routing." Simply stated, there is a policy database that describes admissible flows of traffic among the edge routers of service provider networks, e.g.: Port x on router A is allowed to forward traffic to port y on router B. As policies are modified to reflect business agreements among service providers, a policy enforcer configures the edge routers accordingly.

Another good example of a particular type of technology that the present invention must manage and that presents unique management challenges is the optical network. Optical networks (a.k.a. photonic networks, or Wavelength Division Multiplexing (WDM) networks) are networks whose transmission devices transmit data in the form of wavelength pulses rather than electronic signals. Optical networks are deployed widely in backbone networks in the USA and Europe for telecommunications applications. The speed of data transmission over a single wavelength is many orders of magnitude faster than electronic signals over fiber or copper. Thus, with single wavelength optical networks, the volume of traffic that can be carried over an optical network is limited only by the processing power of the transmission devices, where processing includes the translation of electronic signals into pulses and vice-versa.

The next evolution in optical networking is dense wavelength division multiplexing (DWDM). The physics of light is such that forty or more wavelengths may be utilized in a single fiber and the transmission devices may still distinguish among them. An increase in available bandwidth by at least forty orders of magnitude is an obvious result. The general consensus is that DWDM will be the technology of choice for networking during the 2000s, through which virtually unlimited bandwidth, at least at the backbone level, will be available. However, the actual volume of traffic that can be carried over an optical network is still going to be limited by the processing power of transmission devices.

Thus, in DWDM optical networks, the first challenge is to manage the new transmission devices in the classic style of element management. For example, the management system must be able to monitor the performance of each wavelength. It must assist operators in troubleshooting the network by isolating questionable wavelengths and the possible locations of degradation. A second challenge is to provide inter-operability of WDM management agents with other network management systems.

A further management challenge presented by DWDM networks is the challenge of service provisioning. If a service provider wishes to offer optical bandwidth capacity to consumers, an apparatus is required to allocate, maintain, and de-allocate optical channels over the network. A single channel might be adequate to accommodate several small customers, while a large customer might require two or more channels. However, in order to allocate bandwidth intelligently, the service provider will need to know the amount of used and unused capacity per channel. Thus, a management system that can monitor the throughput over a DWDM optical network and infer reasonable measures of used/unused channel capacity is an important requirement.

The present invention also must manage quality of service (QoS)-based networks. A QoS-Based network is typically a traditional-type network that additionally accommodates multiple qualities of service. The classic example is a multimedia network that carries traffic for diverse kinds of applications, where some traffic can withstand latency but other traffic cannot. One example is a QoS-based network currently under development at Cisco Systems, called a Multiprotocol Label Switching (MPLS) network. MPLS and many other QoS-based networks are based on a resource reservation protocol.

MPLS networks are networks whose transmission devices make decisions about forwarding traffic based on the following constraints: (i) topology, (ii) bandwidth requirements, (iii) media requirements, and (iv) packet labeling. MPLS-based networks center around the idea of constraint-based routing, in which the path for a traffic flow is the shortest path that meets a set of known constraints. When packets enter an MPLS-based network, labeling edge routers (LERs) stamp them with a label. The label contains information on the packet source, destination, bandwidth, delay, socket information, and priority. Once the LER classifies and stamps the packet, it is assigned to a labeled switch path (LSP). As the traffic moves over the assigned LSP, routers place outgoing labels on the packets, again with respect to known constraints.

Some arguments for MPLS-based networks are the following:

Near-optimal use of backbone bandwidth. Specifically, the best route between a source and destination is determined taking into account the known constraints.

Reduction in operating costs. With MPLS traffic engineering, an operator does not have to manually configure the network devices to set up explicit routes. The decision-making is automated in the transmission devices.

Dynamic adaptation and graceful recovery. MPLS-based networks should recover from link or node failures that change the topology of the backbone by adapting to new sets of constraints.

Regulation of quality of service. From a QoS standpoint, service providers should be able to manage different kinds of data streams based on service priority. For instance, customers who subscribe to a premium service plan should see minimal latency and packet loss, while other customers should expect periodic delays in data transmission.

A challenge for managing MPLS-based networks is to verify service levels agreements (SLAs) made with consumers, where consumers have the option of various service levels. This means that measurable parameters must be found to include in the agreement. Transactional response time is a popular parameter to include in an SLA. However, the guarantee is typically a blanket value, e.g. "a round trip delay of packets sent from the customer site to the edge of the Internet of 50 milliseconds or less." Response time management will be harder with MPLS-based networks, and with QoS-based networks in general. Since there will be multiple grades of services offered to consumers, and assuming that transactional response time continues to be used as a performance measure in SLAs, then there will essentially be multiple response time guarantees. This clearly will add further complexity to the service providers' management systems.

Further management challenges are presented by the nascent technology known as active networks. Active networks, unlike traditional networks, are not passive carriers of bits but instead provide the capability for the user to inject customized programs into the networks. The network nodes interpret these programs and perform the desired operation on the data flowing through the network. Management challenges presented by active networks include the need for a closer monitoring of the packets and data elements that traverse the network, since networks will now be controlled by the traffic flowing through them rather than the other way around. Configuration management, the management area involving setting up transmission devices, will also need to be treated in a new manner. In particular, note that it is also possible for only part of an end-to-end network to be occupied by an active network, and thus comprehensive management will be required.

The previous discussion has focused on some of the different types of networking technologies that can be managed by the comprehensive network management system of the invention. It is clear that there are also other types of elements between the networking components and the end-user that must be managed including, for example, computers, applications, and video, voice, application and data services. Thus, the management of network services extends beyond management of just the network.

Figure 4:
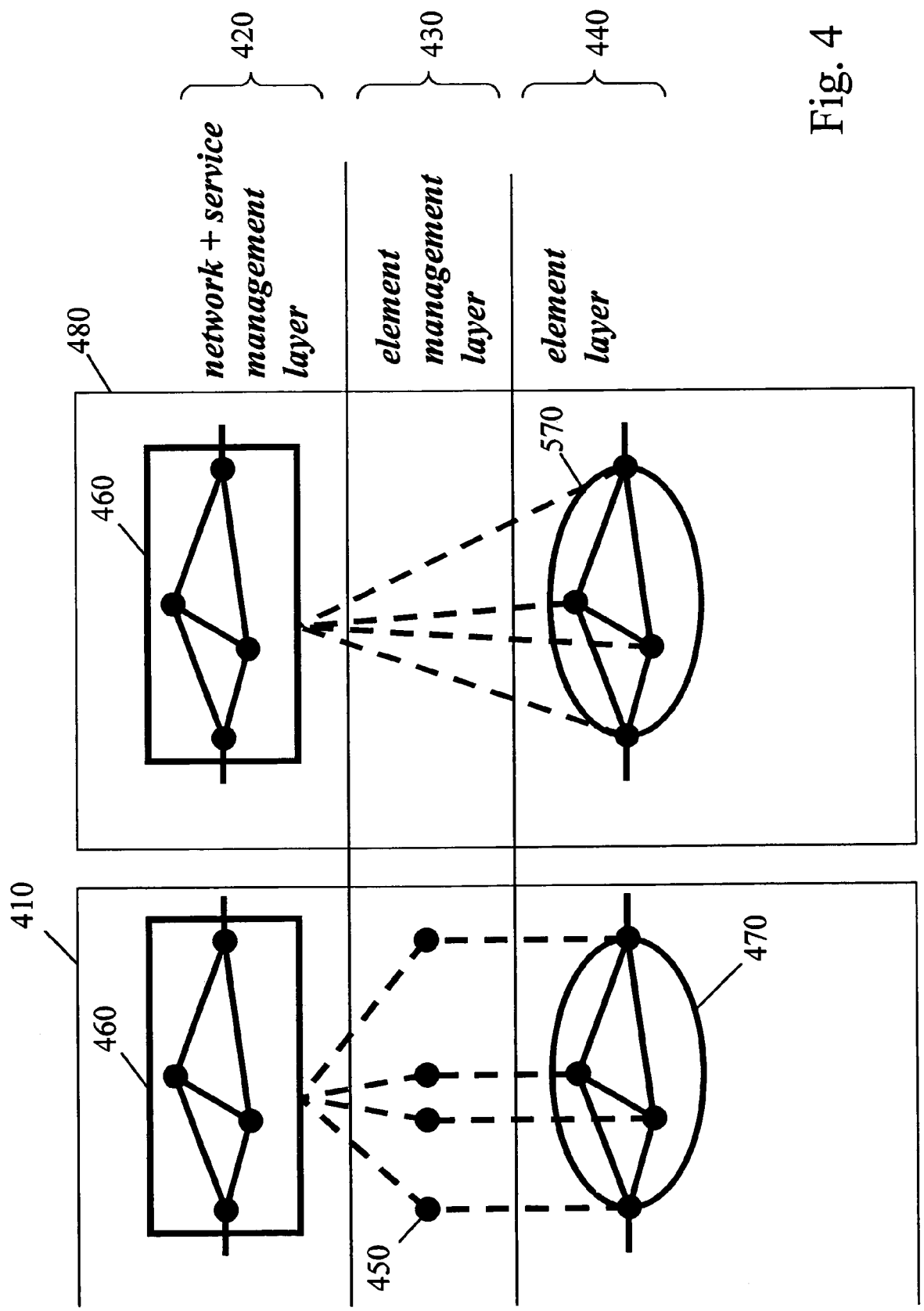
FIG. 4 illustrates two different conceptual models for the integration of element and network management.

The present invention makes use of integration of element and network management. FIG. 4 illustrates two different conceptual models for this task. The dotted lines in FIG. 4 indicate "managed scope" and the horizontal lines indicate the divisions between the network and service management level 420, the element management level 430, and the element level 440. Block 410 illustrates an element-centric management system. In the element-centric approach, there is a collection of element management systems 450 for managing elements 470. Each element management system 450 passes management information to a higher-level network management system 460. It can be seen that method 410 includes an intermediary set of element management systems 450 (indicated by black nodes) between the network management system 460 and the "bare" network elements 470. Thus, the network management system 460 is once removed from the bare elements 470. Block 480 illustrates a network-centric management system, in which the network management system 460 communicates directly with the elements 470.

Both approaches are seen in the industry. The latter approach, for example, is taken by Aprisma's Spectrum. There are trade-offs between the two approaches. Spectrum is popular in the industry in part because it provides multi-vendor management from a single management station. This means, however, that Spectrum engineers have to build management modules for new element types as they enter the market, which in turn means that they have to understand the differences between old and new network technologies, the information models of each technology, and the specific management methods required by each technology. This is, of course, feasible, but it is very labor-intensive.

The element-centric approach requires roughly an equal amount of work, but has as a clear disadvantage the common problem of the proliferation of point management solutions, each requiring deployment, configuration, and operational learning curves. A further disadvantage is the lack of a consistent operational interface. What often happens, therefore, is that new technologies are developed in research labs in accordance with the element-centric philosophy, in order to initially develop appropriate management techniques. Once the technology settles, vendors such as Aprisma incorporate the management methods into an existing commercial network management system. It is expected that this approach will frequently be utilized in the addition of new managed elements and systems to the lower-level management systems of the invention. An advantage of the present invention is that these additions will be hidden from the higher, inter-domain levels, vastly reducing the need for such things as operational learning curves.

Figure 5:
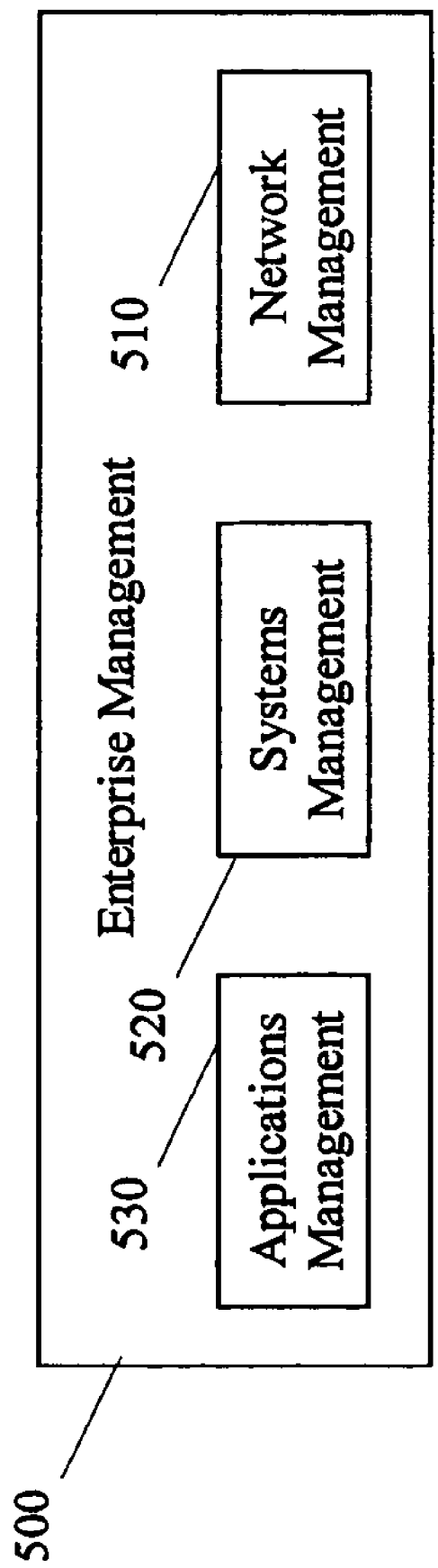
FIG. 5 is a block diagram illustrating the conceptual architecture of an enterprise management system that may be employed for cross-domain management in an embodiment of the invention.

In the industry, the word "enterprise management" has come to connote the management of applications, systems, and networks. In this respect, an enterprise management system is already a multi-domain management system. FIG. 5 is a block diagram illustrating the conceptual architecture of an enterprise management system that may be employed for cross-domain management in an embodiment of the invention.

In FIG. 5, network management system or systems 510, systems manager or managers 520, and application manager or managers 530 are themselves managed by enterprise management system 500. The various underlying management systems 510, 520 and 530 may be any of the many such management systems known in the art that are capable of being managed by an enterprise management system. Enterprise management system 500 may be the Aprisma Spectrum Enterprise Manager or any other management system known in the art that is capable of managing the various underlying management systems 510, 520, and 530.

Often, management systems 122, 124, and 126 of FIG. 1 will be enterprise management systems. However, not all management systems will have to monitor and control computer systems and applications in addition to the network. For example, the management of an optical network does not include the management of end user systems and applications, although the health of an optical network will affect the health of end user applications. For this reason, management systems 122, 124, and 126 in FIG. 5 may be simple network, application, or systems managers or agents.

While enterprise management and the comprehensive management of the invention share certain elements, there are a number of aspects of comprehensive management that enterprise management cannot provide. By its very definition, enterprise management is not truly comprehensive in nature, being specifically established to provide network, traffic, computer system and application management solely for a single enterprise (i.e. a single business entity). The comprehensive management of the invention is, in many ways, the sum of enterprise management, plus service provider network management for as many service providers as are part of the system being managed. Further, enterprise management typically does not manage according to the levels in the TMN hierarchy, discussed later with reference to FIG. 9, does not provide Service Level Management, discussed later with reference to FIG. 10, or deal with the interface between the two. In addition, the comprehensive management of the invention includes the management of multiple networking technologies, at the core network, edge network, and customer premises and, in particular, allows the TMN model and service level management to be applied to all these domains. Finally, the comprehensive management of the present invention provides both business level management and a generally higher level of management abstraction, neither of which is available with enterprise management.

Figure 6:
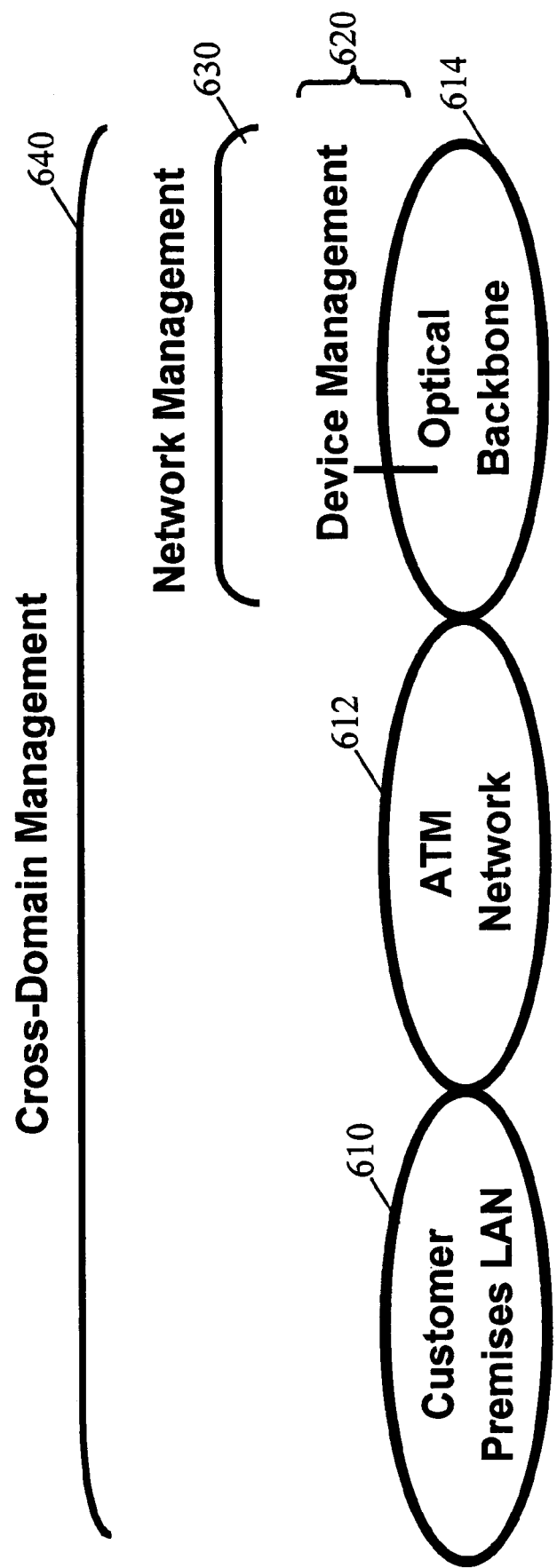
FIG. 6 is an example of a network comprised of multiple interconnected networking technologies that may be managed by use of the present invention.

FIG. 6 is used to illustrate the manner in which the invention may be used to manage an example network—a multi-provider VPN. FIG. 1 illustrated how the management systems of the present invention each manage individual networking technology domains. The example embodiment in FIG. 6 shows three such domains: a customer premises network 610, an ATM network 620, and an optical backbone 614. In this embodiment, the individual elements in each of domains 610, 612, and 614 are managed by appropriate device managers 620. The device managers 620 within each domain are themselves managed by a domain-specific network management system 630.

Figure 7:
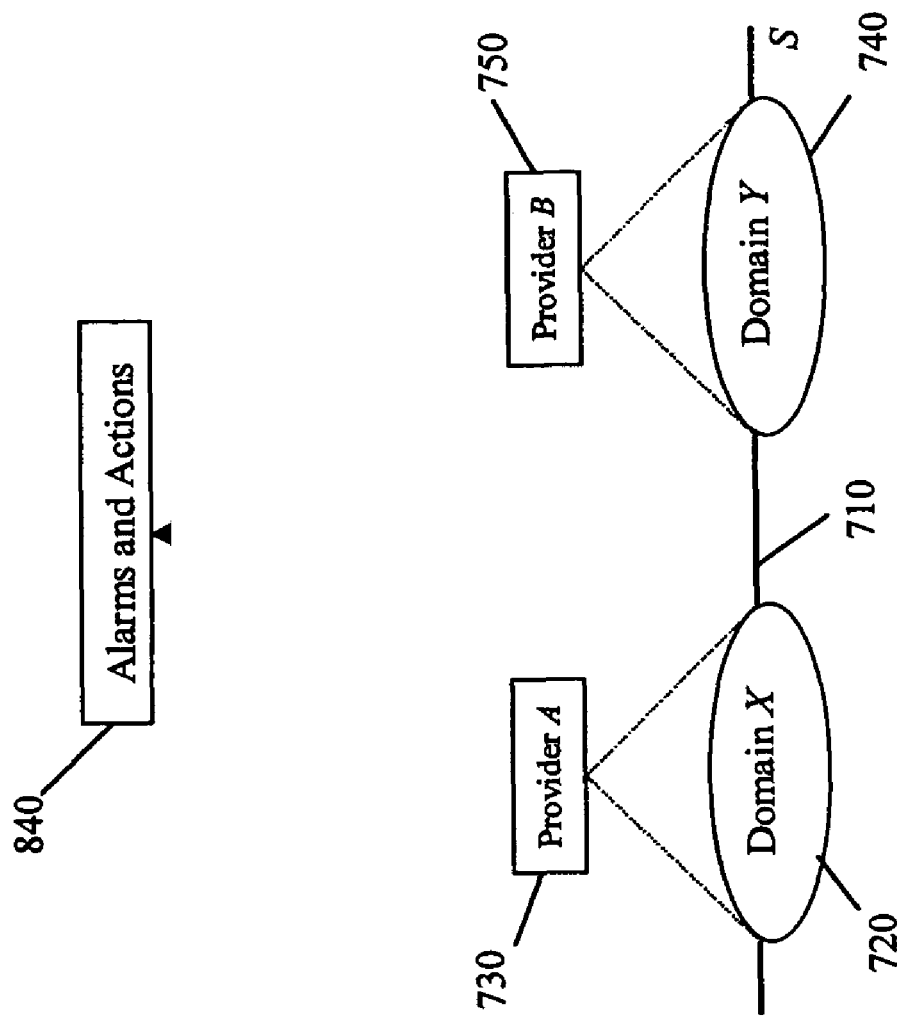
FIG. 7 is utilized to discuss the management challenge provided by the management of domains controlled by different entities.

In this example, each network is provided and operated by a third party utilizing its own management platforms and management processes. If there is a VPN that spans across all of those networks, then clearly the management of the VPN depends upon management information collected by the respective domain network management systems 620. Thus, FIG. 1 shows intra-domain data from domains A 102, B 104, and C 106 being passed to an inter-domain data correlation function 142. The inter-domain data correlation function 142 processes intra-domain data and returns data back to domains A 102, B 104, and/or C 106 in the form of operational instructions. Such operational instructions may have to do with faults, configurations, or service provisioning In fact, large businesses often have to construct VPNs that span across multiple heterogeneous networks, where some of the networks are privately owned. This "separation challenge" is illustrated in FIG. 7. FIG. 7 is a conceptual depiction of a such a network, having managed domains controlled by different entities. In FIG. 7, domain X 720 is managed by provider A 730, but a service S 710 offered by A depends upon a domain Y 740 that is managed by provider B 750. As mentioned, this separation challenge is common in the industry. The result of such a situation, from the network operator's point of view, is management complexity in terms of security management, operations management, problem management, configuration management, policy management, change management. The present invention is specifically designed to reduce or eliminate these problems.

There are four logical approaches to the problem presented by the example of FIG. 7:

1. A limits its service offerings to those that depend upon the networks under its control.
2. A doesn't offer service guarantees in cases where the service depends upon networks not under its control.
3. A and B enter an arrangement whereby network operators collaborate to handle service degradations and faults.
4. B opens its domain to A's management system, or vice versa.

As can be seen, approaches 1 and 2 sidestep the separation problem altogether, while approaches 3 and 4 tackle it head on. In particular, approach 4 returns directly to the need for the integrated management provided by the comprehensive network management system of the invention.

Another common manifestation of the separation problem is seen even within businesses that control their own local services, where, for example, A is a staff dedicated to network management (domain X) and B is a staff dedicated to systems and applications management (domain Y). Often it seems that these people rarely talk to each other, and when they do, it takes the form of finger-pointing. Clearly, an integrated management system would also help to alleviate this internal separation problem.

The preferred embodiment of the invention employs domain-specific event correlation. Event correlation entails observing cause-and-effect relations between certain events, inferring an alarm from a set of related events, and/or identifying the "culprit" event in a "misbehaving" enterprise. In practice, a particular network management system will collect numerous events and statistics as it monitors the elements in its respective domain. The task of event correlation is to map certain collections of events scattered in space and time into alarms and possible actions. There are several paradigms in the industry for event correlation, including rule-based reasoning, model-based reasoning, state transition graphs, codebooks, and case-based reasoning. Additional paradigms are also currently being investigated in research laboratories, e.g. fuzzy logic and neural networks.

Figure 8:
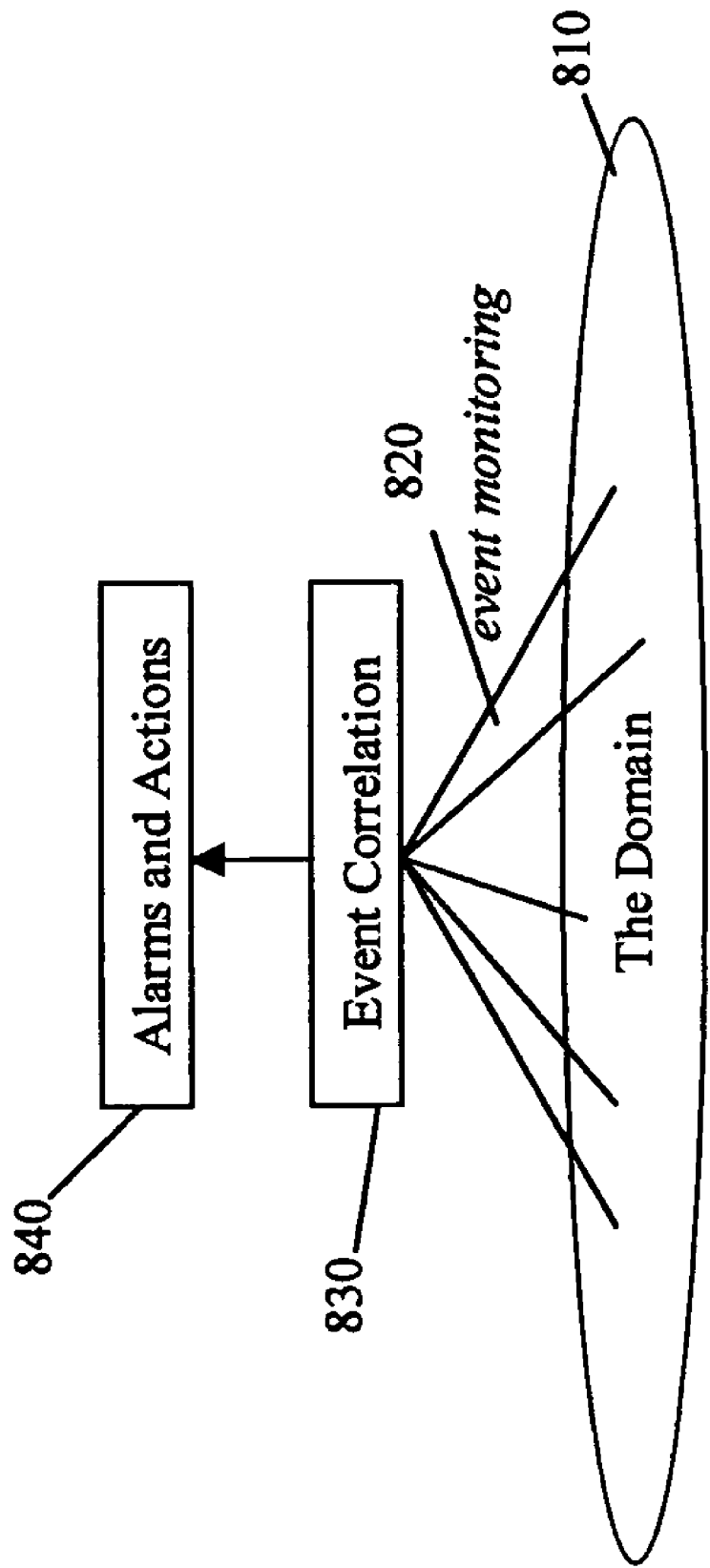
FIG. 8 is a conceptual model of intra-domain event correlation as utilized by the present invention.

FIG. 8 depicts intra-domain event correlation as utilized by the present invention. As shown in FIG. 8, domain 810 is subject to event monitoring 820. When events occur, they are processed by the event correlation engine 830 and mapped into alarms and actions 840. Any of the paradigms for event correlation mentioned previously would be suitable. Many commercial management systems, including Spectrum, now either have event correlation engines or are integrable with them.

Regardless of the particular paradigm used, domain-specific event correlation is another example of the "divide and conquer" approach to network management that is employed by the present invention. In general, single event correlation engine for a large heterogeneous networking system will not scale. Thus, it is advisable to employ separate correlation engines for each individual domain, where the output of each engine is passed to a higher-level correlation engine. The inter-domain data correlation function 146 of FIG. 1 is such a higher-level correlation engine. In this capacity, its domain, i.e. its input, is the space of intra-domain alarms.

The invention therefore requires correlation engines for both lower-level intra-domain management systems and for higher-level inter-domain management systems. The idea is similar to the concept of a manager of managers (MOM). There are in fact several commercial products available that act as MOMs. Their sole function is to receive input data from lower-level network or element management systems, process the data, and output data in the form of reports and recommended actions.

The additional consideration of systems and application management ties in with the need for domain-specific event correlation. A common question regarding an end user's complaint is "Is it a network, systems, or application problem?" A response time management (RTM) system, for example, can raise a problem regarding sluggishness in application transactions, but further work needs to be done in order to determine whether the cause of the problem has to do with the application, the computer system on which the application resides, or the network. An event correlation system that covers systems and application events helps in isolating the root cause of the problem.

Figure 9:
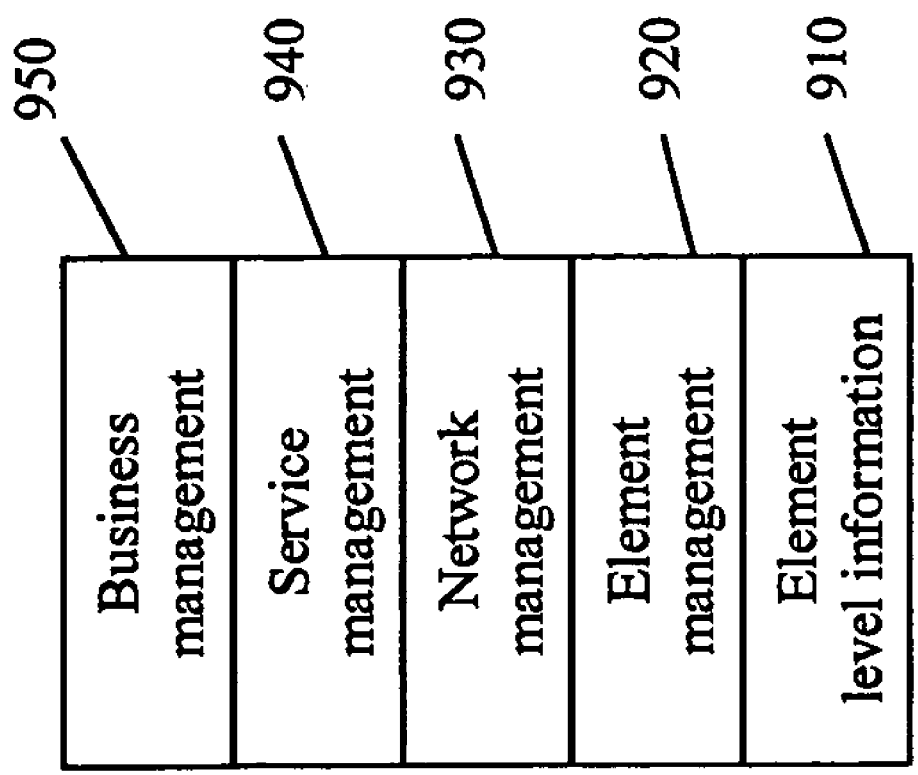
FIG. 9 is the Telecommunications Model Network (TMN) conceptual model of integrated management.

An important concept in network management is the five-layer Telecommunications Management Network (TMN) model shown in FIG. 9. The TMN model is partitioned into five layers: the element layer 910, the element management layer 920, the network or enterprise management layer 930, the service management layer 940, and the business management layer 950. Each layer, going from bottom to top, represents a transformation from technical detail towards more business-oriented information.

The business layer 950 is concerned with the overall management of the business. As such, it covers aspects relating to business processes and strategic business planning. Further, it seeks to capture information that may be used to determine whether business objectives and policies are being met. The service management layer 940 is concerned with the management of services provided by a service provider to a customer or to another service provider. Examples of such services include billing, order processing, and trouble ticket handling. The enterprise/network management layer 930 is concerned with a network with multiple elements. As such, it supports network monitoring and remote configuration. In addition, this layer supports issues such as bandwidth control, performance, quality of service, end-to-end flow control and network congestion control. The element management layer 920 is concerned with the management of individual network elements including, for example, switches, routers, bridges, and transmission facilities. The element layer 910 refers to the bare elements that are to be managed.

The TMN idea has influenced those businesses that own their own networks as well as businesses that outsource pieces of the network operation to service providers. For the most part, commercial networks are manageable up to, and including, the network layer. The ideas of "services" and "service level agreements" are now on the minds of business executives and service providers.

A service may be viewed from a user's point of view, from a business' point of view, or from the network's point of view. The service provided by an optical network, for example, is the allocation of bandwidth to a customer. This service from a business' point of view may be decomposed into the service provided by the optical network plus the services provided by its own local network, systems, and applications. This is therefore yet another example of the divide and conquer technique, whereby a higher-level service is comprised of several lower-level services. Thus, with reference to FIG. 1, end-to-end services are managed at inter-domain level 140, and local services are managed at the intra-domain levels 130, 150 and 160.

Figure 10:
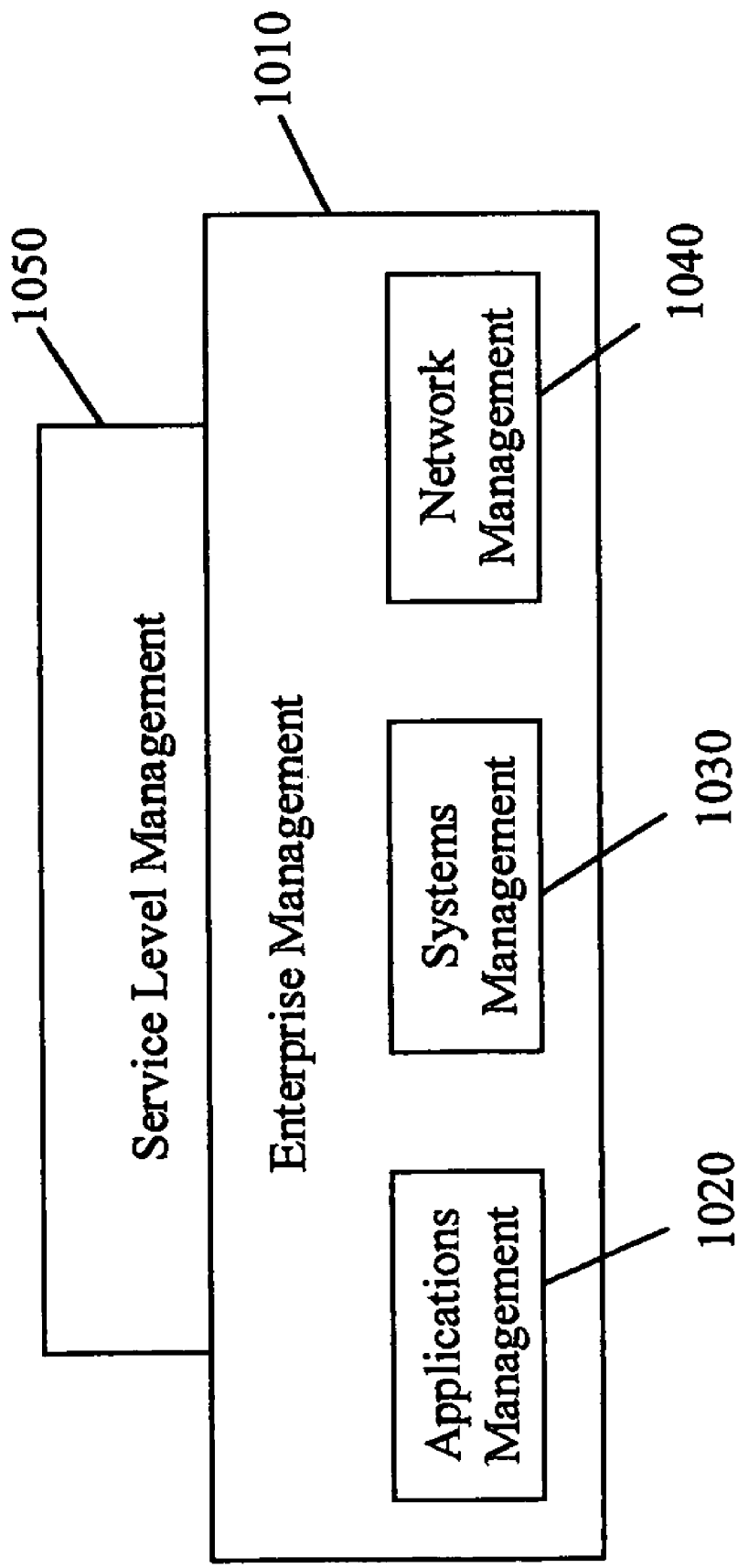
FIG. 10 is a conceptual depiction of how service level management is utilized in conjunction with enterprise management in one embodiment of the invention.

FIG. 10 is a conceptual depiction of how service level management is therefore utilized in conjunction with enterprise management in an embodiment of the invention. In FIG. 10, network management system or systems 1040, systems manager or managers 1030, and application manager or managers 1020 are themselves managed by enterprise management system 1010. In turn, enterprise manager 1010 is subject to service level management 1050. As previously discussed, service level management 1050 is concerned with the management of services provided by a service provider to a customer or another service provider. As in FIG. 5, the network management layer may possibly include the management of computer systems and software applications that reside on the network, and the term "element" is used to include individual systems and applications in addition to transmission devices.

As mentioned previously, the invention provides classical FCAPS management (fault, configuration, accounting, performance, and security management). Fault management includes trouble management, which manages corrective actions for service, fault recovery, and proactive maintenance and provides capabilities for self-healing. Trouble management correlates alarms to services and resources, initiates tests, performs diagnostics to isolate faults to a replaceable component, triggers service restoral, and performs activities necessary to repair the diagnosed fault. Proactive maintenance responds to near-fault conditions that degrade system reliability and may eventually result in an impact on services. It performs routine maintenance activities on a scheduled basis and initiates tests to detect or correct problems before service troubles are reported.

Configuration management includes timely deployment of resources to satisfy the expected service demands, and the assignment of services and features to end-users. It identifies, exercises control over, collects data from, and provides data to the network for the purpose of preparing for, initializing, starting, and providing for the operation and termination of services. It deals with logical, service, or custom networks such as the toll network, local public switched telephone network, and private networks. Accounting management processes and manipulates service and resource utilization records and generates customer billing reports for services rendered. It establishes charges and identifies costs for the use of services and resources in the network.

Performance management addresses processes that ensure the most efficient utilization of network resources and their ability to meet user service-level objectives. It evaluates and reports on the behavior of network resources and ensures the peak performance and delivery of each voice, data, or video service. Security management controls access to, and protects, both the network and network management systems against intentional or accidental abuse, unauthorized access, and communication loss. Flexibility methods are built into security mechanisms in order to accommodate ranges and inquiry privileges that result from the variety of access modes utilized by operations systems, service provider groups, and customers.

Multi-wave optical networks can be used as an example to illustrate how the TMN model and FCAPS management are applied to a new technology in order that it can be managed with the comprehensive network management system of the invention. As previously mentioned, multi-wave optical networks promise to change the face of communications by enabling advanced applications in federal, scientific, and commercial sectors. The first problem in managing multi-wave optical networks, however, is to develop what is sometimes called an "information model" for the new networking technology, i.e. a model that depicts the physics of optical networks in terms of management concepts. For example, the information model of multi-wave optical networks includes models of optical components (optical-to-electronic terminating equipment, multiplexing equipment, optical amplifiers, etc.) and models of wavelengths (e.g. section trails, multiplex trails, and channel trails). Typically, the information model is used also as a base to develop FCAPS-style and TMN-style management methods for the technology.

Consider what a commercial network management vendor has to worry about in this kind of situation: The vendor is not in the business of developing optical networks. It is in the business of managing them. However, in order to understand how to manage them, the vendor's scientists and architects have to keep close watch on the development of the technology, its special management methods, and its commercial viability.

Aprisma Management Technologies is an example of such a vendor. Aprisma's Spectrum is commercially popular; it is good at managing existing enterprise networks, service provider networks, ATM and frame relay networks, cable networks, and others. It is also good at multi-vendor device management and event correlation over single- and multi-domain networks. Aprisma's stated goal is to provide a comprehensive management solution and, in that regard, it competes with vendors such as HP, Tivoli Computer Associates, Objective Systems, and a number of start-up companies in the network management space.

The Spectrum system is based on the object-oriented information paradigm, whereby network components are conceived as objects that represent their real-world counterparts. An object-oriented system helps to alleviate the problem of introducing models of multi-vendor elements into an existing system. Further; it expedites the generation of management methods for domains other than networks and network elements. Systems, applications, and service management products are incorporated into Spectrum by third-party vendors.

The object-oriented paradigm is more or less a de facto paradigm for developing information models for new networking technologies, including multi-wave optical networks. Since Spectrum's information model is based on the object-oriented paradigm, there is a fortunate commensurability between it and the information models of new networking technologies. It is hard, however, to predict how the information models developed by different networking vendors or vendor consortia will stabilize into a standard, even though they are based on the object-oriented paradigm.

A need in the industry as a whole is to develop a common language for specifying network technologies and the management of them. This, in fact, is the main goal of standards bodies. A good start in that direction is the ITU-T Recommendation G.805—Generic Network Information Model (1995). Many of the management concepts for optical networks, for example, are derived from that document. It is therefore advisable that frameworks for network management systems migrate towards an alignment with such information models. In the preferred embodiment of the invention, this approach is followed.

As previously seen, today's business and service networks are complex. The current state of any particular network has more than likely evolved in a piecemeal fashion, and thus it will include heterogeneous kinds of network technologies, equipment from multiple vendors, and various kinds of management methods. To make matters worse, management methods vary between countries and even between districts within countries. In many cases, the result is either piecemeal management, in which narrowly focused management solutions co-exist but do not cooperate, or no management at all. The solution is integrated management, in which these management techniques cooperate in a standardized management framework. Thus, the ultimate goal of international standards bodies is to provide a uniform framework and methodology in order to correct the current situation. The problem, however, is that the standardization process is often slow and sometimes doesn't mature into a globally accepted standard.

The goal of a generic framework by which to manage diverse networking technologies is certainly a good idea. However, no matter how much a vendor wants to develop a comprehensive, single-console management system, there will still be times when an integration with another vendor's management system makes good sense. A good example is the integration of an existing management system with a legacy management system.

Further, there is a valid argument that no one vendor can provide all the solutions. As a practical matter, vendors tend to be more or less specialists in one domain or another. For example, some are good at building network management systems, some are good at building network simulation systems, some are good at building trouble ticket and help desk systems, etc. Thus, a direction for future work is to catalogue various kinds of integration patterns and mechanisms by which to implement them.

Figure 11:
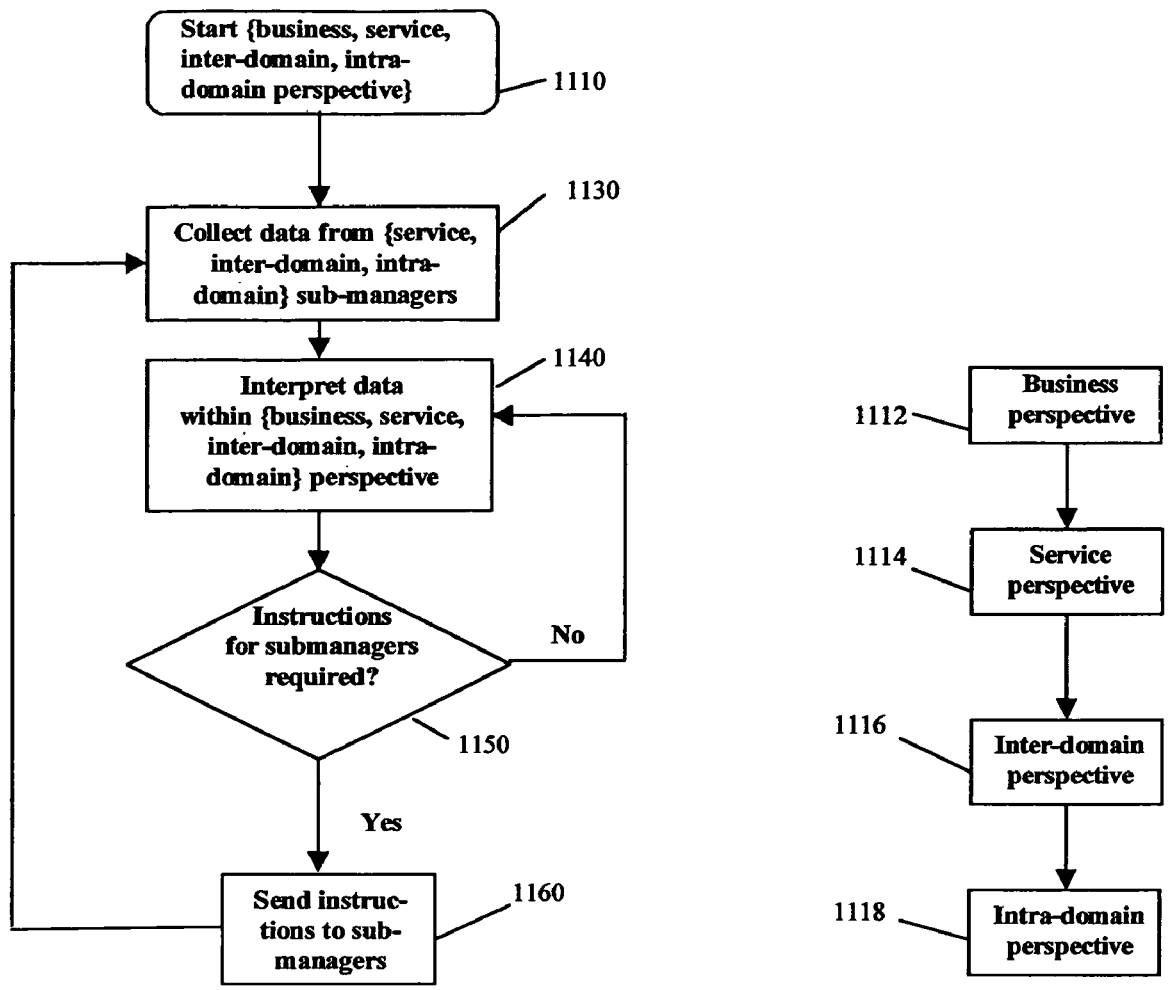
FIG. 11 illustrates the operation of an embodiment of the comprehensive network management system of the present invention.

A high-level operational flowchart of comprehensive network management according to one aspect of the invention is shown in FIG. 11. In FIG. 11, the functional steps starting at box 1110 are carried out simultaneously at all the levels of abstraction of the invention. In other words, the same steps are carried out from the business perspective 1112, the service perspective 1114, the inter-domain perspective 1116, and the intra-domain perspective 1118. All that varies is the level of abstraction upon which the steps operate and the corresponding level of abstraction of the input data and output instructions.

As shown in FIG. 11, data is collected 1130 at a particular level of abstraction by use of an appropriate data collection function. The data is then interpreted 1140 from the appropriate level of abstraction perspective. The manner of interpreting data may be carried out by any of the many means known in the art, including, but not limited to, look-up tables, expert systems, machine learning systems, etc. If the data interpretation 1140 determines that instructions are required for submanagers at a lower level of abstraction 1150, an instruction function at the appropriate level of abstraction sends the required instructions 1160 to the appropriate submanagers.

For example, with reference also to FIG. 1, data from domains A 102, B 104, and C 106 is collected 1130 by intra-domain data collection functions A 134, B 154 and C 164 at the intra-domain level 1118 (130, 150, 160) and provided to the inter-domain level 1116 (140) where it is processed by the inter-domain data correlation function 142. Inter-domain data correlation function 142 may also provide this data to inter-domain event correlation function 146. If data correlation function 142 determines, either from its own analysis or based on feedback from inter-domain event correlation function 146, that instructions to management systems A 122, B 124 and/or C 126 are required 1150, then inter-domain data correlation function 142 provides instructions to one or more of intra-domain instructions functions A 132, B 152, and C 162 at the intra-domain level 1118 (130, 150, 160). Intra-domain instructions functions A 132, B 152, and C 162 then provide appropriate instructions to respective management systems A 122, B 124 and C 126 at the intra-domain level 1118 (130, 150, 160). From this example, it is to be understood that the actions of the invention at the other levels of abstraction would have a similar character, according to the principles around which that level of abstraction is organized.

The following steps are development steps by which the current invention may be constructed for each individual technology domain.

1. Element development
2. Element-style management
3. Fault and Configuration Management in Element-style Management
4. Network-style management
5. Intra-domain event correlation
6. Intra-domain service level management
7. Inter-domain network management
8. Inter-domain event correlation
9. Inter-domain service level management
10. Inter-domain business process management It is to be understood that these steps apply to the implementation of management of a single domain, and that similar development steps would therefore need to be applied to each technology domain in order to fully realize the comprehensive network management system of the invention.

What has been described herein is merely illustrative of the application of the principles of the present invention. Other arrangements, methods, modifications and substitutions by one of ordinary skill in the art are also considered to be within the scope of the present invention, which is not to be limited except by the claims that follow.

What is claimed is:

1. A method for comprehensively managing a communications environment, wherein the communications environment comprises a plurality of network domains, each network domain comprising a separately managed communications network having intra-domain management components, the intra-domain management components comprising: an intra-domain data management component that manages the network domain; an intra-domain event correlation component that receives events from the intra-domain data management component, maps the events into one or more of alarms or actions, and transmits the alarms or actions to the intra-domain data management component; and an intra-domain service level management component that receives service data relating to levels of service provided by the network domain from the intra-domain data management component, formulates intra-domain service instructions using the service data, and transmits the intra-domain service instructions to the intra-domain data management component, the method comprising:

receiving, at an inter-domain data collection module, domain-specific data from the intra-domain management components of two or more network domains of the plurality of network domains, wherein the domain-specific data includes service data and event data, wherein event data includes data relating to one or more of events or alarms mapped from events;

receiving, at an inter-domain event correlation module, event data relating to the at least two network domains from the inter-domain data collection module;

determining, at the inter-domain event correlation module, whether to generate one or more inter-domain events based on the received event data;

receiving, at an inter-domain service level management module, service data relating to the at least two network domains from the inter-domain data collection module;

comparing, at the inter-domain service level management module, the received service data with one or more predefined service levels;

generating, at the inter-domain service level management module, one or more inter-domain service management actions based on the comparison;

receiving, at a business process management module, one or more of the service data relating to the at least two network domains or the generated one or more inter-domain service management actions from the inter-domain service level management module; and determining, at the business process management module, whether one or more predefined business objectives are met using one or more of the service data or the inter-domain service management actions.

2. The method of claim 1, wherein generating one or more inter-domain service management actions further comprises:

generating, at the inter-domain service level management module service instructions based on the one or more inter-domain service management actions;

receiving, at the inter-domain data collection module, the service instructions from the inter-domain service level management module; and transmitting, from the inter-domain data collection module, the service instructions to one or more of the intra-domain data management components of the at least two network domains.

3. The method of claim 1, wherein determining whether to generate one or more inter-domain events further comprises:

correlating, at the inter-domain event correlation module, the received event data into one or more inter-domain events;

determining, at the inter-domain event correlation module, whether to generate one or more inter-domain alarms based at least in part on the one or more inter-domain events;

generating, at the inter-domain event correlation module, one or more inter-domain actions when one or more inter-domain alarms are generated;

receiving, at the inter-domain data collection module, the one or more generated inter-domain actions; and transmitting, from the inter-domain data collection module, the one or more generated inter-domain actions to one or more of the intra-domain data management components of the at least two network domains.

4. A computer readable storage medium storing computer executable instructions for comprehensively managing a communications environment, wherein the communications environment comprises a plurality of network domains, each network domain comprising a separately managed communications network having intra-domain management components, the intra-domain management components comprising: an intra-domain data management component that manages the network domain; an intra-domain event correlation component that receives events from the intra-domain data management component, maps the events into one or more of alarms or actions, and transmits the alarms or actions to the intra-domain data management component; and an intra-domain service level management component that receives service data relating to levels of service provided by the network domain from the intra-domain data management component, formulates intra-domain service instructions using the service data, and transmits the intra-domain service instructions to the intra-domain data management component, the instructions operable when executed to:

receive, at an inter-domain data collection module, domain-specific data from the intra-domain management components of two or more network domains of the plurality of network domains, wherein the domain-specific data includes service data and event data, wherein event data includes data relating to one or more of events or alarms mapped from events;

receive, at an inter-domain event correlation module, event data relating to the at least two network domains from the inter-domain data collection module;

determine, at the inter-domain event correlation module, whether to generate one or more inter-domain events based on the received event data;

receive, at an inter-domain service level management module, service data relating to the at least two network domains from the inter-domain data collection module;

compare, at the inter-domain service level management module, the received service data with one or more predefined service levels;

generate, at the inter-domain service level management module, one or more inter-domain service management actions based on the comparison;

receive, at a business process management module, one or more of the service data relating to the at least two network domains or the generated one or more inter-domain service management actions from the inter-domain service level management module; and determine, at the business process management module, whether one or more predefined business objectives are met using one or more of the service data or the inter-domain service management actions.

5. The computer readable storage medium of claim 4, wherein the instructions when executed operable to generate one or more inter-domain service management actions are when executed further operable to:

generate, at the inter-domain service level management module service instructions based on the one or more inter-domain service management actions;

receive, at the inter-domain data collection module, the service instructions from the inter-domain service level management module; and transmit, from the inter-domain data collection module, the service instructions to one or more of the intra-domain data management components of the at least two network domains.

6. The computer readable storage medium of claim 4, wherein the instructions when executed operable to determine whether to generate one or more inter-domain events are when executed further operable to:

correlate, at the inter-domain event correlation module, the received event data into one or more inter-domain events;

determine, at the inter-domain event correlation module, whether to generate one or more inter-domain alarms based at least in part on the one or more inter-domain events;

generate, at the inter-domain event correlation module, one or more inter-domain actions when one or more inter-domain alarms are generated;

receive, at the inter-domain data collection module, the one or more generated inter-domain actions; and transmit, from the inter-domain data collection module, the one or more generated inter-domain actions to one or more of the intra-domain data management components of the at least two network domains.

7. A system for comprehensively managing a communications environment, wherein the communications environment comprises a plurality of network domains, each network domain comprising a separately managed communications network having intra-domain management components, the intra-domain management components comprising: an intra-domain data management component that manages the network domain; an intra-domain event correlation component that receives events from the intra-domain data management component, maps the events into one or more of alarms or actions, and transmits the alarms or actions to the intra-domain data management component; and an intra-domain service level management component that receives service data relating to levels of service provided by the network domain from the intra-domain data management component, formulates intra-domain service instructions using the service data, and transmits the intra-domain service instructions to the intra-domain data management component, the system comprising:

one or more processors configured to:
receive, at an inter-domain data collection module, domain-specific data from the intra-domain management components of two or more network domains of the plurality of network domains, wherein the domain-specific data includes service data and event data, wherein event data includes data relating to one or more of events or alarms mapped from events;

receive, at an inter-domain event correlation module, event data relating to the at least two network domains from the inter-domain data collection module;

determining, at the inter-domain event correlation module, whether to generate one or more inter-domain events based on the received event data receive, at an inter-domain service level management module, service data relating to the at least two network domains from the inter-domain data collection module;

compare, at the inter-domain service level management module, the received service data with one or more predefined service levels;

generate, at the inter-domain service level management module, one or more inter-domain service management actions based on the comparison;

receive, at a business process management module, one or more of the service data relating to the at least two network domains or the generated one or more inter-domain service management actions from the inter-domain service level management module; and determine, at the business process management module, whether one or more predefined business objectives are met using one or more of the service data or the inter-domain service management action.

8. The system of claim 7, wherein the one or more processors configured to generate one or more inter-domain service management actions are further configured to:

generate, at the inter-domain service level management module service instructions based on the one or more inter-domain service management actions;

receive, at the inter-domain data collection module, the service instructions from the inter-domain service level management module; and transmit, from the inter-domain data collection module, the service instructions to one or more of the intra-domain data management components of the at least two network domains.

9. The system of claim 7, wherein the one or more processors configured to determine whether to generate one or more inter-domain events are further configured to:
- correlate, at the inter-domain event correlation module, the received event data into one or more inter-domain events;
- determine, at the inter-domain event correlation module, whether to generate one or more inter-domain alarms based at least in part on the one or more inter-domain events;
- generate, at the inter-domain event correlation module, one or more inter-domain actions when one or more inter-domain alarms are generated;
- receive, at the inter-domain data collection module, the one or more generated inter-domain actions; and
- transmit, from the inter-domain data collection module, the one or more generated inter-domain actions to one or more of the intra-domain data management components of the at least two network domains.

10. A method for managing a communications network comprising a first domain managed at a first management layer and a second domain managed at a second management layer, the method comprising:
- receiving first service management information from the first management layer and second service management information from the second management layer,
- wherein the first service management information was correlated, at the first management layer, from a plurality of first service information, the first service management information comprising information related to services being provided by one or more first service providers at the first domain,
- wherein the second service management information was correlated, at the second management layer, from a plurality of second service information, the second service management information comprising information related to services being provided by one or more second service providers at the second domain;
- correlating the first service management information with the second service management information; and
- generating inter-domain service management information based on the correlated first service management information and second service management information, wherein the inter-domain service management information comprises information related to services being provided on the communications network.

11. The method of claim 10, further comprising:
- generating first service instructions based on the generated inter-domain service management information.

12. A computer readable storage medium storing computer executable instructions for managing a communications network comprising a first domain managed at a first management layer and a second domain managed at a second management layer, the instructions operable when executed to:
- receive first service management information from the first management layer and second service management information from the second management layer,
- wherein the first service management information was correlated, at the first management layer, from a plurality of first service information, the first service management information comprising information related to services being provided by one or more first service providers at the first domain,
- wherein the second service management information was correlated, at the second management layer, from a plurality of second service information, the second service management information comprising information related to services being provided by one or more second service providers at the second domain;
- correlate the first service management information with the second service management information; and
- generate inter-domain service management information based on the correlated first service management information and second service management information, wherein the inter-domain service management information comprises information related to services being provided on the communications network.

13. The computer readable medium of claim 10, the instructions when executed further operable to:
- generate first service instructions based on the generated inter-domain service management information.

14. A system for managing a communications network, the communications network comprising a first domain managed at a first management layer and a second domain managed at a second management layer, the system comprising:
- one or more processors configured to:
  - receive first service management information from the first management layer and second service management information from the second management layer,
  - wherein the first service management information was correlated, at the first management layer, from a plurality of first service information, the first service management information comprising information related to services being provided by one or more first service providers at the first domain,
  - wherein the second service management information was correlated, at the second management layer, from a plurality of second service information, the second service management information comprising information related to services being provided by one or more second service providers at the second domain;
  - correlate the first service management information with the second service management information; and
  - generate inter-domain service management information based on the correlated first service management information and second service management information, wherein the inter-domain service management information comprises information related to services being provided on the communications network.

15. The system of claim 10, the one or more processors further configured to:
- generate first service instructions based on the generated inter-domain service management information.

16. A method for comprehensively managing a communications network comprising a first network and a second network, the method comprising:
- receiving first network management information collected at a first domain, wherein the first domain is connected to the first network, the first network employing a first type of network technology;
- receiving second network management information collected at a second domain, wherein the second domain is connected to the second network, the second network employing a second type of network technology, wherein the first type of network technology is different from the second type of network technology;
- generating a first information model that describes management of the first network and generating a second information model that describes management of the second network;

correlating the first network management information with the second network management information using the first information model and the second information model;

generating inter-domain results based on the correlation; and determining one or more first operational instructions according to the first type of network technology employed by the first network, wherein the one or more first operational instructions are based on the generated inter-domain results and are implemented at the first domain.

17. The method of claim 16, wherein the communications network is a virtual private network (VPN) that traverses the first network and the second network.

18. The method of claim 16, wherein the first information model is based on a common language for specifying network technologies.

19. A method for comprehensively managing a communications network comprising a first network and a second network, the method comprising:

receiving first network management information collected at a first domain, wherein the first domain is connected to the first network, the first network employing a first type of network technology;

receiving second network management information collected at a second domain, wherein the second domain is connected to the second network, the second network employing a second type of network technology, wherein the first type of network technology is different from the second type of network technology;

generating a first information model that describes management of the first network and generating a second information model that describes management of the second network;

correlating the first network management information with the second network management information using the first information model and the second information model; and generating inter-domain results based on the correlation;

wherein the first type of network technology comprises an optical networking technology and wherein the generated first information model relates to physics of the optical networking technology.

20. The method of claim 19, wherein said generating a first information model further comprises modeling one or more optical components of the first network.

21. The method of claim 20, wherein the one more optical components of the first network comprises at least one of the following: an optical-to-electronic terminating equipment, a multiplexing equipment, or an optical amplifier.

22. The method of claim 20, wherein said generating a first information model further comprises generating one or more models of wavelengths.

23. The method of claim 22, wherein the one or more models of wavelengths comprise at least one of the following: at least one section trail, at least one multiplex trail, or at least one channel trail.

* * * * *